(12) United States Patent
Karneges

(10) Patent No.: US 10,091,316 B2
(45) Date of Patent: Oct. 2, 2018

(54) CONNECTION-ORIENTED PROXY PUSH-PULL SERVER

(71) Applicant: Fanout, Inc., Mountain View, CA (US)

(72) Inventor: Justin Karneges, Vacaville, CA (US)

(73) Assignee: Fanout, Inc., Mountain View, CA (US)

( * ) Notice: Subject to any disclaimer, the term of this patent is extended or adjusted under 35 U.S.C. 154(b) by 260 days.

(21) Appl. No.: 14/875,671

(22) Filed: Oct. 5, 2015

(65) Prior Publication Data

US 2017/0099329 A1    Apr. 6, 2017

(51) Int. Cl.
*H04L 29/08* (2006.01)
*H04L 29/06* (2006.01)

(52) U.S. Cl.
CPC .......... *H04L 67/26* (2013.01); *H04L 65/605* (2013.01); *H04L 67/28* (2013.01); *H04L 67/42* (2013.01)

(58) Field of Classification Search
CPC ........................................................ H04L 67/26
See application file for complete search history.

(56) References Cited

U.S. PATENT DOCUMENTS

| | | | |
|---|---|---|---|
| 2011/0022471 A1* | 1/2011 | Brueck | G06Q 30/02 709/217 |
| 2011/0154223 A1* | 6/2011 | Whitnah | H04L 51/32 715/753 |
| 2011/0208822 A1* | 8/2011 | Rathod | G06F 17/30867 709/206 |
| 2012/0116883 A1* | 5/2012 | Asam | G06Q 30/0251 705/14.58 |
| 2013/0143542 A1* | 6/2013 | Kovvali | H04W 48/18 455/418 |

* cited by examiner

*Primary Examiner* — Jeffrey R Swearingen

(57) ABSTRACT

A connection-oriented proxy push-pull network server, including: obtaining a history of the live content in response to a request from a client via a connection-oriented communication channel; obtaining a set of updates to the live content in response to the request from the client; and combining the history and the updates into a merged content stream back to the client via the connection-oriented communication channel.

18 Claims, 6 Drawing Sheets

CONNECTION-ORIENTED PROXY PUSH-PULL SERVER

BACKGROUND

A server can provide a publish-subscribe mechanism that enables clients of the server to obtain content from the server. For example, a messaging server can provide a publish-subscribe mechanism that enables clients of the messaging server to subscribe to and receive messages published by the messaging server.

A client of a publish-subscribe mechanism can miss out on messages published before a subscription is established. In addition, a client of a publish-subscribe mechanism can miss out on messages when network transmission errors occur, or when the client fails to keep up with the rate of message publication.

SUMMARY

In general, in one aspect, the invention relates to a proxy push-pull server that enables a client to access a set of live content via a connection-oriented communication channel, the proxy push-pull server obtaining a history of the live content and a set of updates to the live content in response to a request from the client via the connection-oriented communication channel and combining the history and the updates into a merged content stream back to the client via the connection-oriented communication channel.

In general, in another aspect, the invention relates to a method for accessing a set of live content. The method can include: obtaining a history of the live content in response to a request from a client via a connection-oriented communication channel; obtaining a set of updates to the live content in response to the request from the client; and combining the history and the updates into a merged content stream back to the client via the connection-oriented communication channel.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
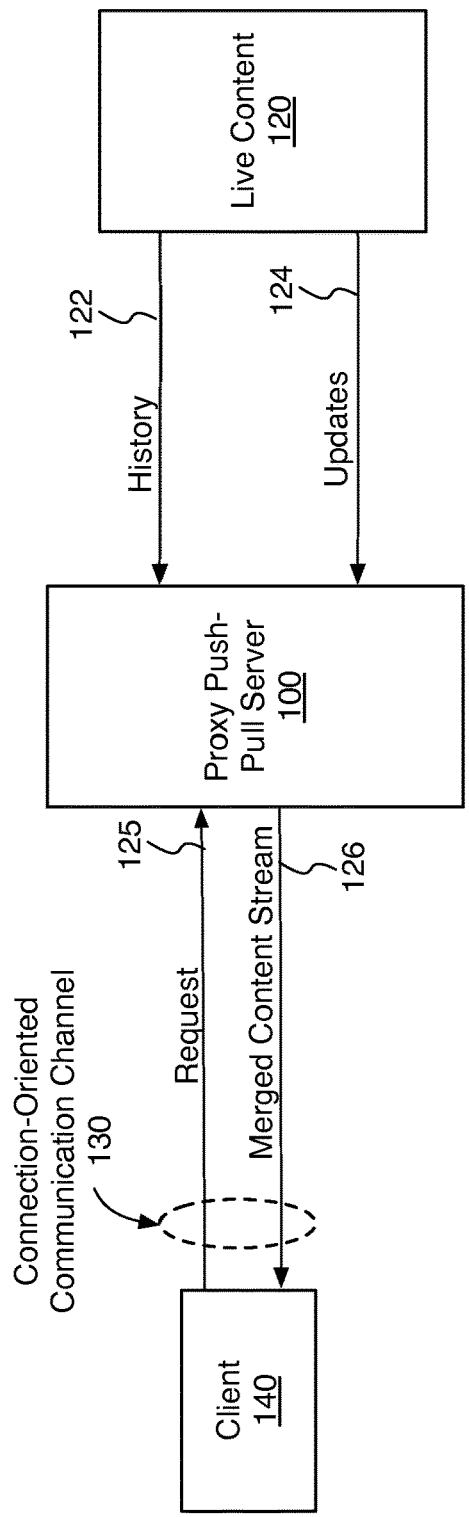
FIG. 1 illustrates a proxy push-pull server that enables a client to access a set of live content via a connection-oriented communication channel.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 illustrates a proxy push-pull server 100 that enables a client 140 to access a set of live content 120 via a connection-oriented communication channel 130. The proxy push-pull server 100 obtains a history 122 of the live content 120 and a set of updates 124 of the live content in response to a request 125 from the client 140 via the connection-oriented communication channel 130. The proxy push-pull server 100 combines the history 122 and the updates 124 into a merged content stream 126 back to the client 140 via the connection-oriented communication channel 130.

The live content 120 can be any content that is updated over time. Examples of the live content 120 include media content, game content, messaging system content, information system content, etc.

The connection-oriented communication channel 130 can be any communication channel that provides flow control by ensuring that data packets are received by the client 140 in sequence and that data is not transmitted faster than the client 140 can receive it, at least while a connection between the client 140 and the proxy push-pull server 100 is active. One example of a connection-oriented communication channel is one based on Transmission Control Protocol/Internet Protocol (TCP/IP).

The client 140 can be any device for accessing the live content 120, e.g., a computer, mobile device, wearable device, etc. The client 140 can include an application program, mobile app, etc., adapted for accessing the live content 120. An application program, mobile app, etc., can employ networking services in an underlying computer or mobile device operating system to issue the request 125 and obtain the merged content stream 126 using a connection-oriented communication protocol via a network, e.g., using TCP/IP.

Figure 2:
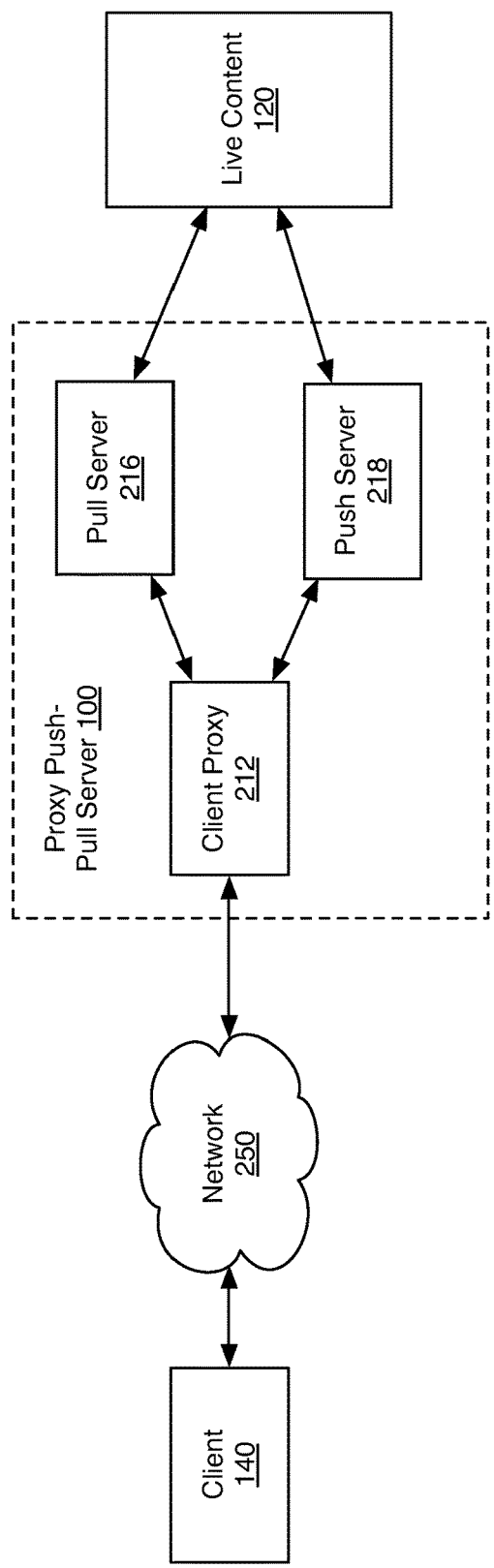
FIG. 2 illustrates a proxy push-pull server in one or more embodiments.

FIG. 2 illustrates the proxy push-pull server 100 in one or more embodiments. The proxy push-pull server 100 includes a pull server 216 that obtains the history 122 of the live content 120 in response to the request 125 from the client 140 received via a network 250 using the connection-oriented communication channel 130. The proxy push-pull server 100 includes a push server 218 that obtains the updates 124 of the live content 120 according to a set of listening criteria associated with the client 140. The proxy push-pull server 100 includes a client proxy 212 that combines the history 122 and the updates 124 into the merged content stream 126 back to the client 140 via the network 250 using the connection-oriented communication channel 130.

Figure 3:
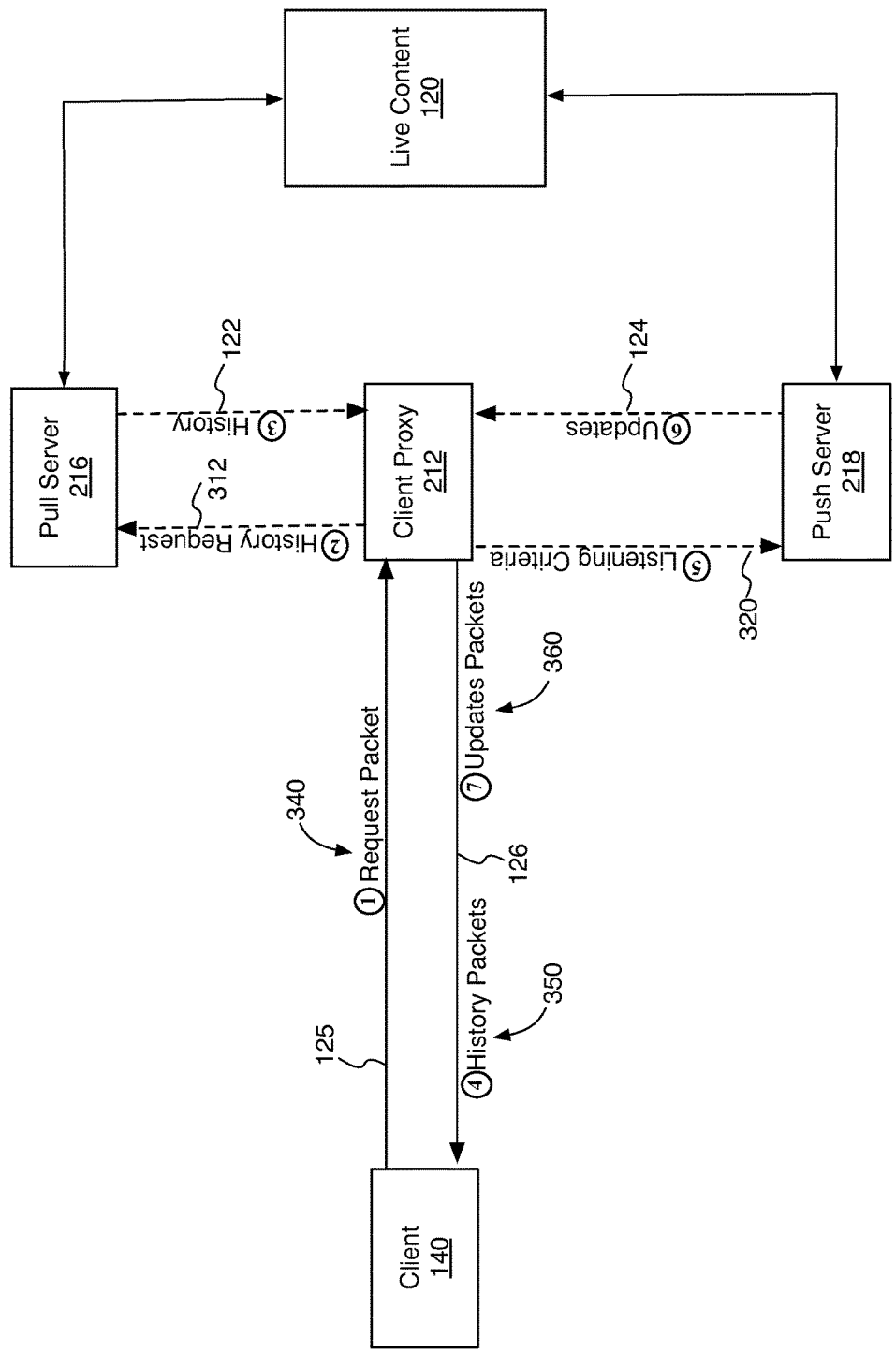
FIG. 3 shows how a proxy push-pull server handles a request for a set of live content from a client in one or more embodiments.

FIG. 3 shows how the proxy push-pull server 100 handles the request 125 for the live content 120 from the client 140. The request 125 includes a request packet 340 that carries a set of parameters that define an initial access to the live content 120 by the client 140.

The client proxy 212 handles the request 125 by issuing a history request 312 to the pull server 216. The history request 312 includes the initial access parameters from the request packet 340 that define a content of the history being requested. The pull server 216 handles the history request 312 by obtaining the history 122 according to the initial access parameters, and returning the history 122 to the client proxy 212. The client proxy 212 transfers the history 122 to the client 140 as a series of history packets 350 in the merged content stream 126.

The initial access parameters in the request packet 340 can be adapted to the particulars of the live content 120 and the client 140. For example, if the live content 120 is a source of push messages of a messaging service then the initial access parameters can yield the last x messages targeted for the client 140 as the history 122. The history 122 from the pull server 216 includes a set of subsequent history parameters that define a content definition for a possible subsequent history. The subsequent history parameters enable the client proxy 212 to request a subsequent history from the pull server 216. The client proxy 212 stores the subsequent history parameters for possible later use. The push server 218 can provide an updated set of subsequent history parameters to the client proxy 212 at any time so that the client proxy 212 will use the updates to the subsequent history parameters for the next history request to the pull server 216 if needed.

The client proxy 212 posts a set of listening criteria 320 to the push server 218 in response to the content request 125. The listening criteria 320 specify a set of criteria for the updates 124. For example, if the live content 120 is a source of push messages of a messaging service then the listening criteria 320 can identify the client 140 as a message receiver and identify types of messages in the live content 120 to be posted to the client 140. The listening criteria 320 can be listening criteria according to a publish-subscribe protocol of the push server 218 for access to the live content 120.

The client proxy 212 merges the updates 124 yielded by the listening criteria 320 into the merged content stream 126 as a series of updates packets 360 as the updates 124 are posted by the push server 218. The client proxy 212 can employ a sequencing mechanism to merge the updates 124 into the merged content stream 126. For example, if the live content 120 is a source of push messages for a messaging service then the client proxy 212 merges push messages into the merged content stream 126 in response to a sequence number assigned to each push message so that push messages are sent sequentially in the merged content stream 126.

Figure 4:
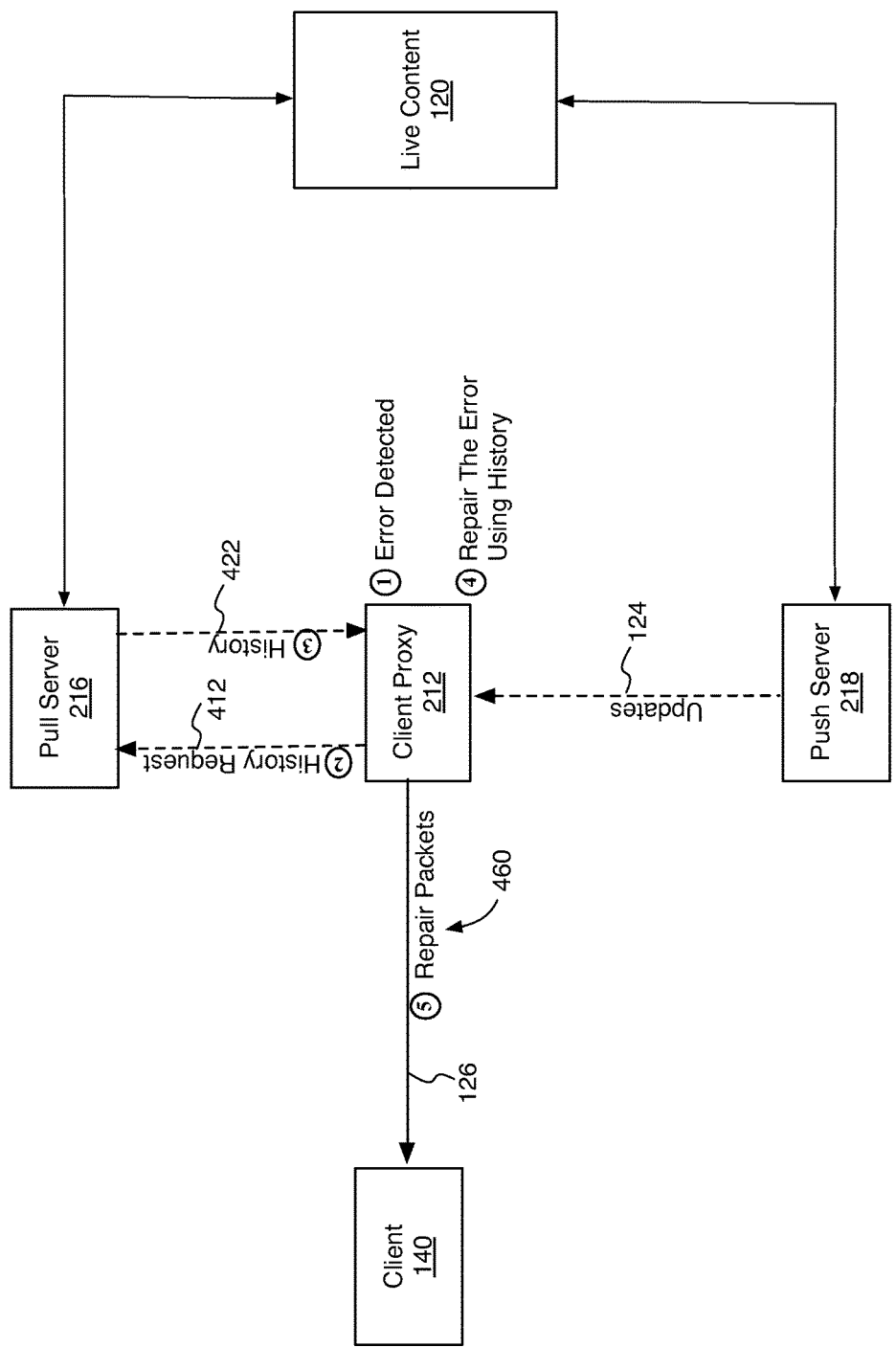
FIG. 4 shows how a proxy push-pull server handles an error in one or more embodiments.

FIG. 4 shows how the proxy push-pull server 100 handles an error in the merged content stream 126. The client proxy 212 can detect an error in the merged content stream 126 by detecting missing content in the updates 124 posted by the push server 218. For example, a missing sequence number in a message stream in the updates 124 can indicate an error. The client proxy 212 can detect an error by detecting a timeout when waiting for the updates 124 to be posted by the push server 218.

The client proxy 212 handles an error by issuing a (subsequent) history request 412 to the pull server 216 using the last set of subsequent history parameters obtained from the pull server 216 or the push server 218. For example, if the history request 312 was a request for the last x messages since the client 140 last accessed the live content 120 then the history request 412 can be a request for the next x messages after the history 122.

The pull server 216 returns a (subsequent) history 422 to the client proxy 212 in response to the history request 412. The history 422 from the pull server 216 includes another set of subsequent history parameters that enable the client 212 to request another subsequent history from the pull server 216. The client proxy 212 stores the subsequent history parameters for possible later use as before.

The client proxy 212 uses the history 422 to repair the error in the merged content stream 126 by recovering any missing content and merging a set of repair packets 460 into the merged content stream 126. For example, if the live content 120 is a source of push messages for a messaging service then the client proxy 212 can use sequence numbers of the push messages in the history 422 to generate the repair packets 460 for the merged content stream 126.

In one or more embodiments, the client proxy 212 divides a large history request into a set of smaller history requests to the pull server 216. For example, the client proxy 212 can generate a set of smaller history requests to the pull server 216 if a large amount of content has been produced in the live content 120 since the last time the client 140 connected to the proxy push-pull server 100. The client proxy 212 merges each history for each smaller history request into the merged content stream 126.

In one or more embodiments, the push server 218 can trigger a history retrieval through hinting. For example, the push server 218 can provide a hint to the client proxy 212 that causes the client proxy 212 to obtain a history from the pull server 216 and use the obtained history to repair/maintain the merged content stream 126.

Figure 5:
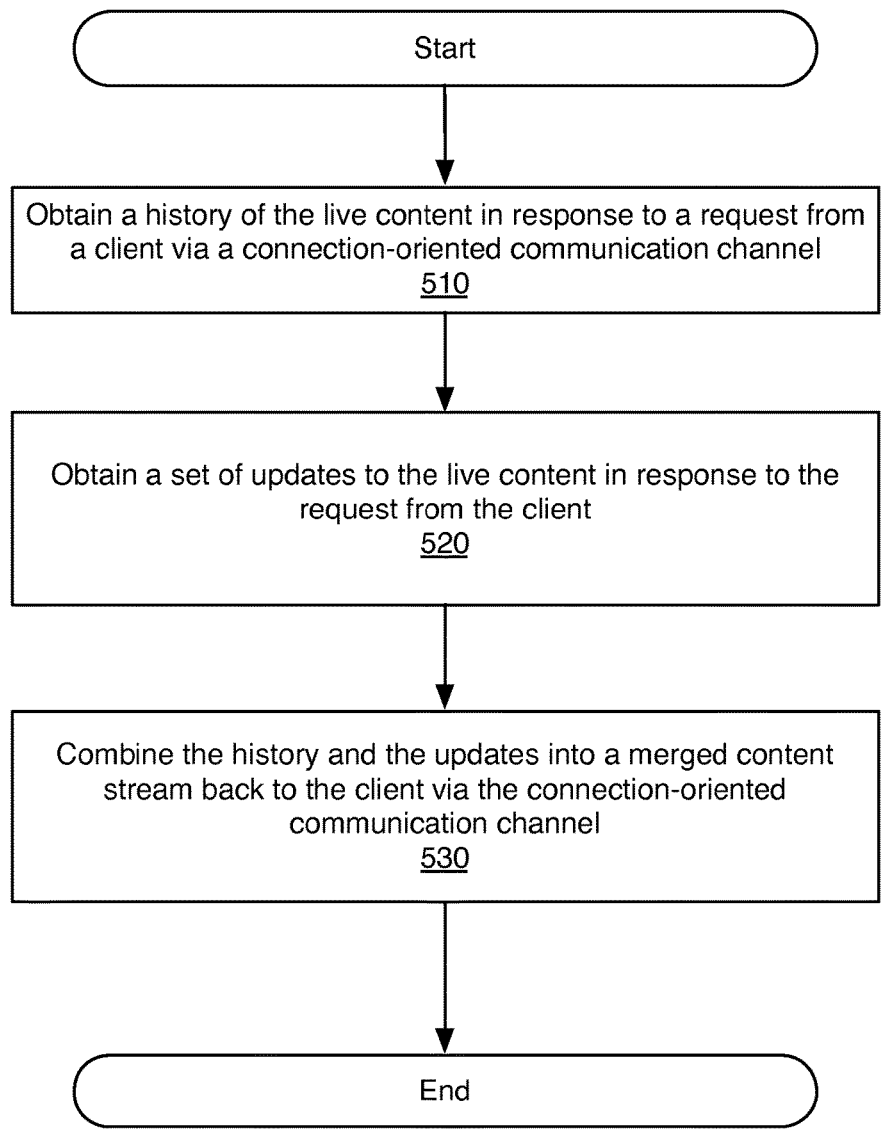
FIG. 5 illustrates a method for accessing a set of live content in one or more embodiments.

FIG. 5 illustrates a method for accessing a set of live content in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

At step 510, a history of the live content is obtained in response to a request from a client via a connection-oriented communication channel. The history can be obtained in one relatively large history using a pull server or can be obtained piecemeal in relatively smaller chunks of the history using multiple requests to the pull server.

At step 520, a set of updates to the live content is obtained in response to the request from the client. The updates can be obtained by posting a set of listening criteria to a push server for the live content.

At step 530, the history and the updates are combined into a merged content stream back to the client via the connection-oriented communication channel. The history and the updates can be streamed back to the client using data packets having sequence numbers for arranging the history and the updates in the merged content stream.

The proxy push-pull server 100 can relieve an app developer for the client 140 of the burdens of implementing special handling of the protocol idiosyncrasies and error handling in a publish-subscribe mechanism for accessing the live content 120. The proxy push-pull server 100 instead yields the live content 120 in a content stream using a connection-oriented protocol—the handling of which is likely built into an underlying platform for an app under development. This can significantly decrease the time and cost of app development and improve reliability when developing and deploying apps.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments of the invention may be implemented on a specialized computer system. Examples of such a computing system can include one or more mobile devices (e.g., laptop computer, smart phone, personal digital assistant, tablet computer, or other mobile device, game console), desktop computers, servers, blades in a server chassis, or any other type of computing device(s) that include at least the minimum processing power, memory, and input and output device(s) to perform one or more embodiments of the invention.

Figure 6:
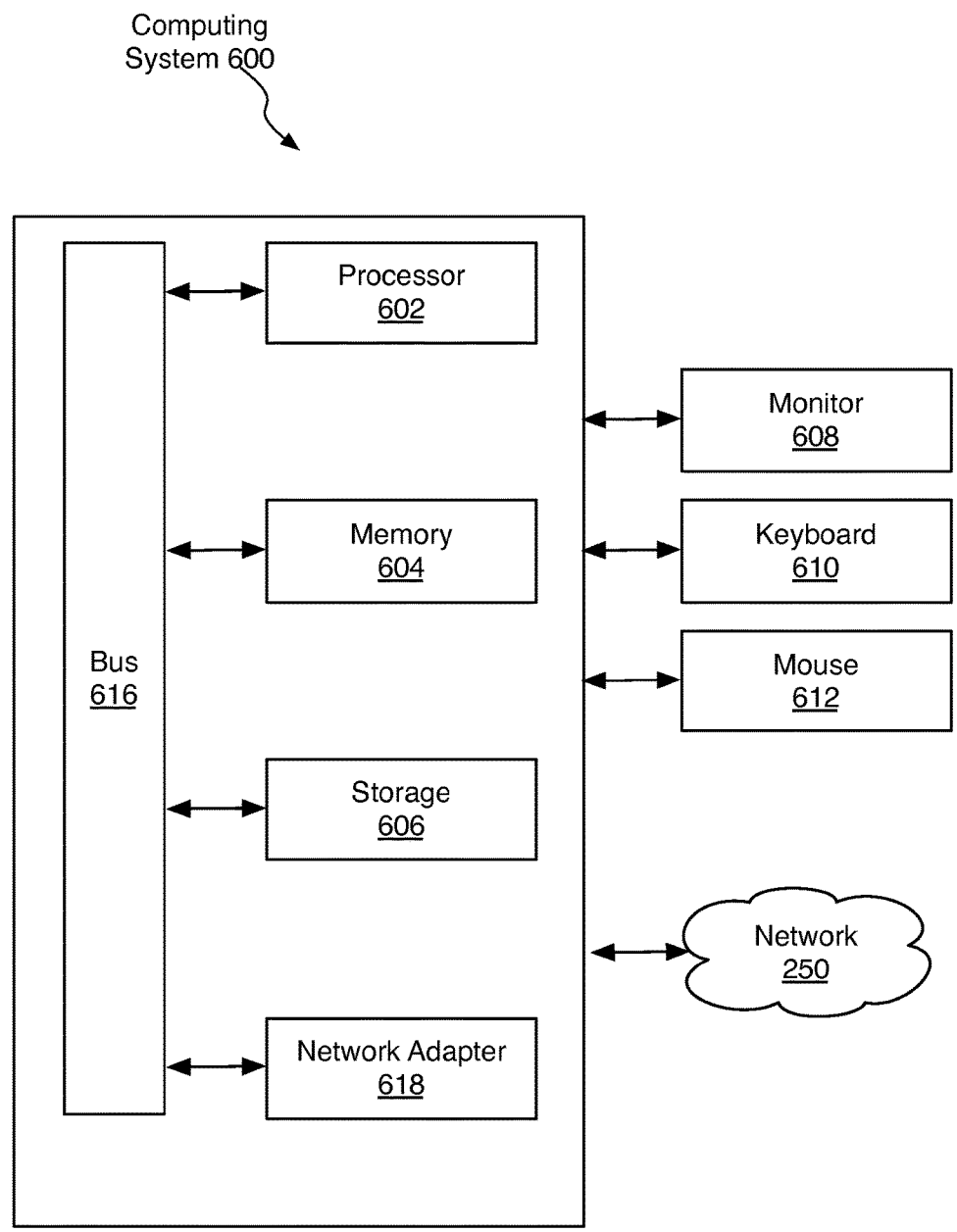
FIG. 6 illustrates a computing system upon which portions of a proxy push-pull server can be implemented.

FIG. 6 illustrates a computing system 600 upon which portions of the proxy push-pull server 100 can be implemented. The computing system 600 includes one or more computer processor(s) 602, associated memory 604 (e.g., random access memory (RAM), cache memory, flash memory, etc.), one or more storage device(s) 606 (e.g., a hard disk, an optical drive such as a compact disk (CD) drive or digital versatile disk (DVD) drive, a flash memory stick, etc.), a bus 616, and numerous other elements and functionalities. The computer processor(s) 602 may be an integrated circuit for processing instructions. For example, the computer processor(s) may be one or more cores or micro-cores of a processor. The computing system 600 may also include one or more input device(s), e.g., a touchscreen, keyboard 610, mouse 612, microphone, touchpad, electronic pen, or any other type of input device. Further, the computing system 600 may include one or more monitor device(s) 608, such as a screen (e.g., a liquid crystal display (LCD), a plasma display, touchscreen, cathode ray tube (CRT) monitor, projector, or other display device), external storage, input for an electric instrument, or any other output device. The computing system 600 may be connected to the network 250 (e.g., a local area network (LAN), a wide area network (WAN) such as the Internet, mobile network, or any other type of network) via a network adapter 618.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A proxy server for accessing a set of content that updates over time according to a series of updates, comprising:
   a push server for subscribing to one or more of the updates of the content;
   a pull server for accessing a set of past updates of the content;
   means for communicating via a communication network according to a connection-oriented communication channel; and
   a client proxy that receives via the connection-oriented communication channel a content request from a client that identifies one or more of the past updates not previously received by the client, the client proxy, in response, obtaining the past updates identified in the content request via the pull server and posting a set of listening criteria for the client to the push server and then merging the past updates obtained from the pull server with a series of new updates obtained from the push server into a content stream back to the client via the connection-oriented communication channel.

2. The proxy server of claim 1, wherein the client proxy obtains a set of parameters for identifying a subsequent set of past updates from the pull server and then in response to an error in the content stream obtains the subsequent set of past updates via the pull server and repairs the error using the subsequent set of past updates obtained from the pull server.

3. The proxy server of claim 1, wherein the client proxy obtains a set of parameters for identifying a subsequent set of past updates from the push server and then in response to an error in the content stream obtains the subsequent set of past updates via the pull server and repairs the error using the subsequent set of past updates obtained from the pull server.

4. The proxy server of claim 1, wherein the client proxy obtains a subsequent set of past updates from the pull server in response to a hint from the push server and then repairs an error in the content stream using the subsequent set of past updates obtained via the pull server.

5. The proxy server of claim 1, wherein the client proxy obtains the past updates identified in the content request by issuing a plurality of history requests to the pull server.

6. The proxy server of claim 1, wherein the client proxy merges the past updates obtained via the pull server with the new updates obtained via the push server in response to a sequence number associated with each past and new update so that the past and new updates are sent sequentially in the content stream back to the client.

7. A communication system, comprising:
   a proxy server that provides access to a set of content that updates over time according to a series of updates, the proxy server having a push server for subscribing to one or more of the updates of the content and a pull server for accessing a set of past updates of the content; and
   a client that transfers a content request to the proxy server using a connection-oriented communication channel to the proxy server via a communication network, the content request identifying one or more of the past updates not previously received by the client;
   such that the proxy server obtains the past updates identified in the content request via the pull server and posts a set of listening criteria for the client to the push server and then merges the past updates obtained via the pull server with a series of new updates obtained via the push server into a content stream back to the client via the connection-oriented communication channel.

8. The communication system of claim 7, wherein the proxy server obtains a set of parameters for identifying a subsequent set of past updates from the pull server and then in response to an error in the content stream obtains the subsequent set of past updates via the pull server and repairs the error using the subsequent set of past updates obtained via the pull server.

9. The communication system of claim 7, wherein the proxy server obtains a set of parameters for identifying a subsequent set of past updates from the push server and then in response to an error in the content stream obtains the subsequent set of past updates via the pull server and repairs the error using the subsequent set of past updates obtained via the pull server.

10. The communication system of claim 7, wherein the proxy server obtains a subsequent set of past updates from the pull server in response to a hint from the push server and then repairs an error in the content stream using the subsequent set of past updates obtained via the pull server.

11. The communication system of claim 7, wherein the proxy server obtains the past updates identified in the content request from the pull server by issuing a plurality of history requests to the pull server.

12. The communication system of claim 7, wherein the proxy server merges the past updates obtained via the pull server with the new updates obtained via the push server in response to a sequence number associated with each past and new update so that the past and new updates are sent sequentially in the content stream back to the client.

13. A method for accessing a set of content that updates over time according to a series of updates, comprising:
providing a push server for subscribing to one or more of the updates of the content;
providing a pull server for accessing a set of past updates of the content;
receiving via a communication network according to a connection-oriented communication channel a content request from a client that identifies one or more of the past updates not previously received by the client;
obtaining the past updates identified in the content request from the pull server;
posting a set of listening criteria for the client to the push server; and
merging the past updates obtained from the pull server with a series of new updates obtained from the push server into a content stream back to the client via the connection-oriented communication channel.

14. The method of claim 13, further comprising:
obtaining a set of parameters for identifying a subsequent set of past updates from the pull server;
obtaining the subsequent set of past updates from the pull server in response to an error in the content stream; and
repairing the error using the subsequent set of past updates obtained from the pull server.

15. The method of claim 13, further comprising:
obtaining a set of parameters for identifying a subsequent set of past updates from the push server;
obtaining the subsequent set of past updates from the pull server in response to an error in the content stream; and
repairing the error using the subsequent set of past updates obtained from the pull server.

16. The method of claim 13, further comprising:
obtaining a subsequent set of past updates from the pull server in response to a hint from the push server; and
repairing an error in the content stream using the subsequent set of past updates obtained by the pull server.

17. The method of claim 13, wherein obtaining the past updates identified in the content request from the pull server comprises issuing a plurality of history requests to the pull server.

18. The method of claim 13, wherein merging comprises merging the past updates obtained from the pull server with the new updates obtained from the push server in response to a sequence number associated with each past and new update so that the past and new updates are sent sequentially in the content stream back to the client.

* * * * *